United States Patent [19]

Hedderich et al.

[11] 4,052,080
[45] Oct. 4, 1977

[54] CART FOR LIVESTOCK

[76] Inventors: Fred L. Hedderich, P.O. Box 106, Camden, Ind. 46917; Curtis C. George, P.O. Box 218, R.R. No. 1, Flora, Ind. 46929

[21] Appl. No.: 699,254

[22] Filed: June 24, 1976

[51] Int. Cl.² .............................................. B62B 1/06
[52] U.S. Cl. .................................. 280/47.26; 214/506
[58] Field of Search ................. 280/47.24, 47.2, 47.26, 280/47.27; 214/506, 370

[56] References Cited

U.S. PATENT DOCUMENTS

| 2,564,248 | 8/1951 | Chenette | 280/47.27 |
| 2,572,945 | 10/1951 | Quesnoit | 214/506 |
| 3,913,762 | 10/1975 | Alexander | 280/47.24 X |

Primary Examiner—Joseph F. Peters, Jr.
Assistant Examiner—R. Schrecengost
Attorney, Agent, or Firm—Blanchard, Flynn, Thiel, Boutell & Tanis

[57] ABSTRACT

A cart, particularly for transporting dead animals within a livestock building, having an elongated platform which extends substantially horizontally and is of an upwardly opening concave configuration. One end of the platform has a wheel assembly disposed thereunder, which wheel assembly includes an axle having a pair of coaxially aligned rollers positioned closely adjacent one another. A guide flange projects outwardly and downwardly from this end of the platform to facilitate the slidable displacement of an animal onto the platform. An elongated handle extends outwardly and upwardly from the other end of the platform and is manually engageable so that a person can pull the cart having the animal thereon. The cart is maintained with the platform spaced slightly upwardly from the floor, whereby the animal is balanced over the support axle while permitting a part of the animal to be slidably dragged along the floor. A winch assembly is mounted on the handle and the cable thereof extends substantially horizontally over the platform for engagement with the animal to facilitate pulling the animal upwardly over the guide flange onto the platform.

12 Claims, 4 Drawing Figures

U.S. Patent  Oct. 4, 1977  4,052,080
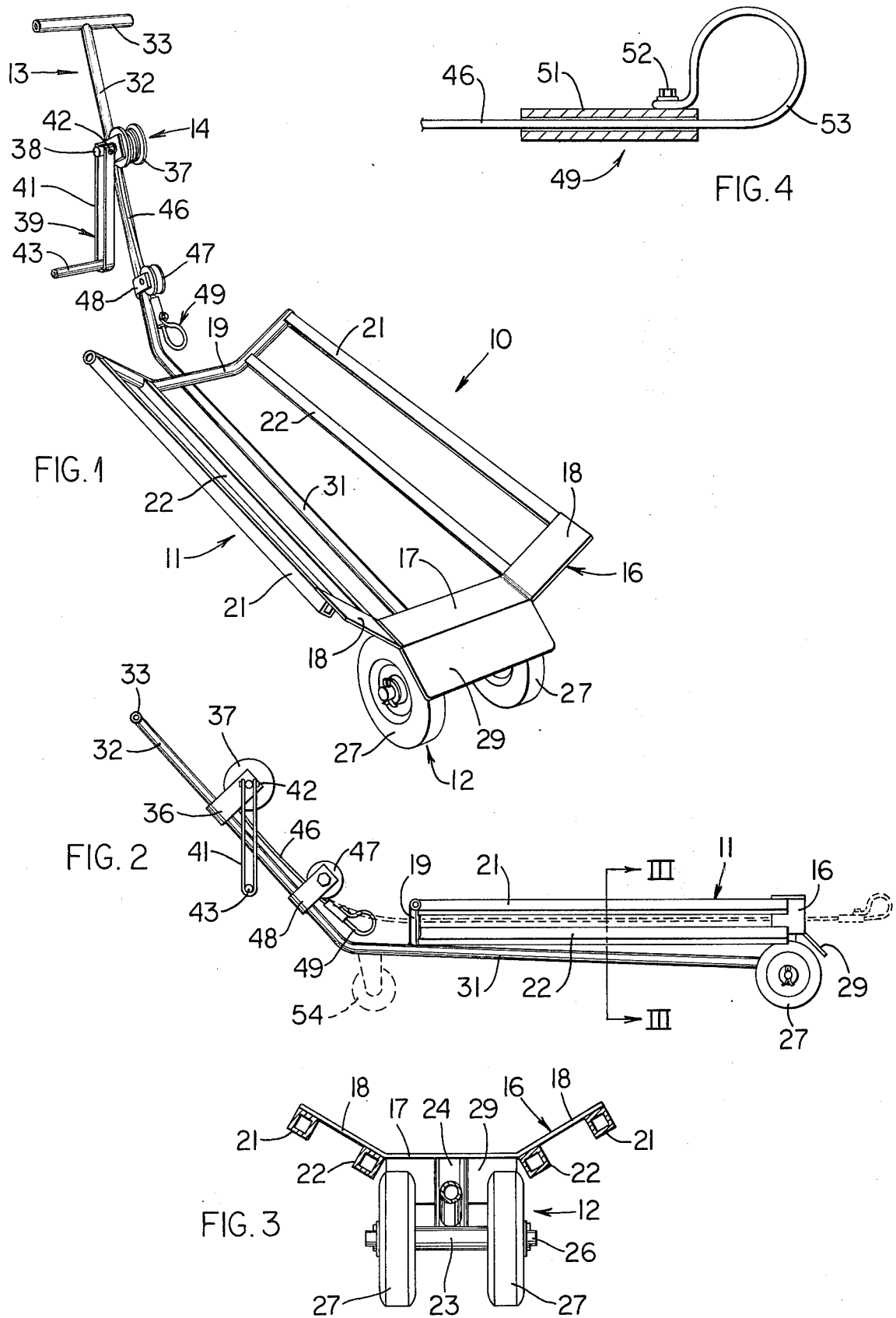

CART FOR LIVESTOCK

FIELD OF THE INVENTION

This invention relates to a cart structure particularly suitable for removing a dead animal from a livestock building.

BACKGROUND OF THE INVENTION

The removal of a dead animal from a livestock building is a difficult and time-consuming operation and involves substantial manual labor since the animal, such as a hog, is heavy and is thus difficult to manipulate. Further, most livestock buildings are constructed such that they do not permit the use of overhead hoists or the like. Also, the isles in such buildings are normally narrow and hence do not accommodate automated equipment.

The removal of a dead hog from such a building is further complicated by the fact that such buildings often utilize a floor structure formed from either narrow slats or an open grate. Floor structures of this type thus do not permit the utilization of many conventional wheeled devices, whereby such devices can accordingly not be utilized to assist in removing the dead animal.

Accordingly, it is an object of the present invention to provide a tiltable, hand-propelled, attendant-stabilized cart designed particularly for use in a livestock building to facilitate the handling and removal of a dead animal, such as a dead hog. The cart of the present invention is particularly designed to permit its utilization on floors employing narrow slats, and is also designed to permit the cart to be moved through rather narrow isles and around the rather sharp corners which exist within said buildings to facilitate the handling, manipulation and removal of a dead animal.

More specifically, the cart of the present invention employs an elongated platform which extends substantially horizontally and is of an upwardly opening concave cross-section, which platform has a wheel assembly disposed under one end thereof and a handle projecting outwardly and upwardly from the other end thereof. The desirable cart of the present invention permits an animal to be pulled partially onto the platform so that it is partially balanced over the support axle located at the one end of the platform, which results in part of the animal remaining in engagement with the floor to stabilize the cart and prevent sideward tipping thereof. The cart thus permits dragging of the dead animal from the building while minimizing the frictional force which must be overcome.

The cart of the present invention has, for another of its objects, the provision of an upwardly opening, concave-shaped platform which assists in properly centering and wheels balancing the animal over the axle. The objects of the invention are further achieved by providing the cart with a winch mounted on the handle, the cable of which extends horizontally across the platform and has a snare or hook on the end thereof which can be engaged with the animal to pull it upwardly onto the platform to effectively balance same over the support axle. The cart structure is further provided with a guide flange which projects outwardly and downwardly from the end of the platform to facilitate the pulling of the animal onto the platform.

The cart of the present invention is also highly desirable since it is structurally simple, it is small-in-size and light-in-weight to facilitate its handling and storage, it is manufactured efficiently and economically, and it is extremely durable so as to be virtually free of maintenance.

Other objects and purposes of the invention will be apparent to persons familiar with carts, and particularly the environment of the present invention, upon reading the following specification and inspecting the accompanying drawings.

BRIEF DESCRIPTION OF THE DRAWINGS

FIG. 1 is a perspective of the cart according to the present invention.

FIG. 2 is a side elevational view of the cart showing same in its normal position of use.

FIG. 3 is a view, partially in section, taken along the line III—III in FIG. 2.

FIG. 4 is a fragmentary enlarged view, partially in cross-section, of the snare provided on the end of the cable.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the cart and designated parts thereof. The words "front" and "rear" will also be utilized to designate the opposite ends of the cart, the front and rear ends of the cart respectively appearing on the right and left sides of FIG. 2. Said terminology will include the words specifically mentioned, derivatives thereof and words of similar import.

DETAILED DESCRIPTION

FIG. 1 illustrates a cart 10 according to the present invention, which cart includes an elongated load support platform 11 thereon. A wheel assembly 12 is disposed under the front end of the platform and a handle structure 13 projects outwardly from the rear end thereof. A winch system 14 is associated with the handle structure to permit a dead animal, such as a hog, to be pulled onto the platform.

Considering now the structure of the support platform 11, which platform is commonly referred to as a basket, same includes a support plate 16 which extends across the front end of the platform and is of a substantially upwardly opening channel-shaped configuration. This support plate 16 includes a substantially horizontal center portion 17 and a pair of side portions 18 which project outwardly and upwardly from the opposite edges of the center portion. These side portions, in the illustrated embodiment, project upwardly at an angle of approximately 45°.

The rearward end of the platform 11 has an end member 19 associated therewith, which member is also of an upwardly opening channel-shaped configuration similar to that of the support plate 16. The support plate 16 and end member 19 are rigidly joined together by a plurality of elongated support rails 21–22 which extend perpendicularly therebetween. The support rails 21 join the opposite free ends of the end member 19 to the free edges of the support plate 16, whereas the support rails 22 join the substantially horizontal center portion of the end member 19 to the horizontal center portion 17. The innermost pair of support rails 22 is thus disposed with a first substantially horizontal plane which is positioned substantially below the horizontal plane defined by the uppermost pair of support rails 21, which rails 21 define the outer edges of the platform. These support rails 21 and 22, which in the illustrated embodiment comprise square tubular elements, are preferably fixed to the support plate 16 and end member 19 as by welding.

The support plate 16 has the wheel assembly 12 disposed thereunder, which assembly includes a horizontally elongated support hub 23 extending transversely of the platform. The support hub 23 is fixedly interconnected to the center support portion 17 by an intermediate support post 24. An axle 26 is rotatably supported within the hub 23, and the opposite ends of the axle have conventional wheels or rollers 27 mounted thereon. The axle 26 can be supported on the hub by conventional anti-friction bearings (not shown) disposed therebetween. The pair of wheels 27 are normally positioned rather closely together, being spaced approximately 9 inches apart in the illustrated embodiment, to permit the wheels to be rollingly supported on the elongated slats which form the floor of the livestock building.

The support plate 16 also has a guide flange 29 rigidly secured to the center support portion 17. This flange 29 projects outwardly and downwardly from the front edge of the center support portion 17, such as at an angle of 45° with respect thereto, to assist in guiding the animal onto the platform. This flange, in the illustrated embodiment, preferably has a width in the order of 2½ to 3½ inches.

As illustrated in FIG. 2, the support axle 23 is positioned directly under the middle of the center support portion 17, which support portion 17 has a width of only a few inches as measured in the horizontal longitudinal direction of the platform. This results in the support axle, and hence the support rollers, being disposed substantially directly under the front edge of the platform.

Considering now the handle structure 13, same is formed from an elongated tubular member and includes an elongated base portion 31 which extends under and longitudinally along the center of the platform. The front end of base portion 31 is fixedly to the support post 24, whereas the rearward end of base portion 31 is fixed to the center of the end member 19. The base portion 31 projects a short distance beyond the end member 19 and is integrally connected to an inclined portion 32 which projects outwardly and upwardly with respect to the platform 11. The inclined portion 32 is integral with the base portion 31, being bent from a single elongated tubular member. Inclined portion 32 projects upwardly at an angle of approximately 45° relative to the horizontal. The upper free end of the inclined portion 32 terminates in a transversely extending grip portion 33, whereby the portions 32 and 33 effectively form a T-shaped handle to permit manual manipulation of the cart.

The winch system 14 as associated with the handle is mounted on the inclined portion 32. For this purpose, the inclined portion 32 has a support yoke 36 fixed at a location disposed between the ends of the inclined portion, which yoke 36 rotatably supports a cable drum 37. The drum has a coaxial drive hub 38 which projects outwardly beyond the support yoke and has an L-shaped crank 39 connected thereto. This crank 39, which is provided to permit manual rotation of the drum 37, includes a radially projecting arm 41 which, at its inner end, is pivotally connected to the drive hub 38 by a hinge pin 42 which extends transversely with respect to the rotational axis of the drum. The radial arm 41 in turn has a handle 43 fixed to the outer end thereof, which handle extends substantially parallel with the axis of the drum to permit manual gripping of the crank 39 and rotation thereof.

The pivotal connection of the crank 39 to the drive hub 38, as by the hinge pin 42, permits the crank to be manually swingably displaced through an angle of 180° within a plane containing the rotational axis of the drum. This enables the position of the crank to be reversed so that the handle 43 projects in the opposite direction and is thus disposed so as to interfere with the inclined handle portion 32. This interference between the handle portion 32 and the handle 43 thus acts as a brake to prevent unwinding of the winch.

The drum 37 has a conventional elongated flexible cable 46 wound therearound, one end of the cable being secured to the drum in a conventional manner. The cable 46 extends outwardly from the drum and passes partially around a rotatable guide pulley 47 which is rotatably supported by a further yoke 48, the latter being fixedly secured to the inclined handle portion 32. The guide pulley 47 is disposed adjacent the lower end of the handle portion 32, in the vicinity of the bend between the portions 31 and 32, to permit the cable 46 to be guided substantially horizontally across the platform 11 while being spaced slightly above the platform so that an animal can be pulled horizontally onto the platform without effecting any substantial lifting thereof. To permit engagement with the animal, the free end of the cable 46 has a snare 49 associated therewith which, as shown in FIG. 4, includes an elongated tubular element 51 secured to the free end of the cable 47 by any conventional means, such as a screw 52. An intermediate portion of the cable 46 passes through the tubular element 51 so as to result in the formation of a loop 53, which loop can be suitably engaged with the animal.

While the cart of the present invention is preferably provided with a snare to permit engagement with the animal, it will be appreciated that other engaging devices can also be provided, such as a hook or the like.

As a further optional feature, the cart of the present invention can be provided with a conventional swivel wheel 54 mounted on the handle portion 31 adjacent the rearward end thereof, substantially as shown in FIG. 2, to assist in stabilizing the cart and to also eliminate the necessity of the operator having to support that part of the weight which is imposed downwardly at the handle 33.

The cart of the present invention is preferably constructed from standard structural elements, such as tubular members and structural plate, with the various components being preferably welded together so that the cart possesses substantial strength and durability while at the same time being simple and economical to manufacture.

OPERATION

The operation of the cart will be briefly described to ensure a complete understanding thereof.

When the cart 10 of the present invention is to be utilized for removing a dead animal, such as a hog, it can be either carried or wheeled into the livestock building and positioned in front of the dead animal. The cart is positioned so that the basket 11 extends substantially horizontally, as illustrated in FIG. 2, and is disposed so that the longitudinal direction of the basket is substantially aligned with the length of the animal's body. The winch 14 is then reversely rotated to unwind the cable 46, which cable is pulled across the length of the platform. The loop 53 is associated with the snare 49 is suitably enlarged to permit its positioning over a suitable part of the animal, such as the snout or rear legs. The winch drum 37 is then rotated in the opposite direction (clockwise in FIG. 2) to cause a tensioning of the cable and hence a tightening of the snare around the animal. Continued rotation of the cable drum causes the cable 46 to be pulled substantially horizontally across the platform 11 so as to permit winding of the cable on the drum. This results in a substantially horizontal pulling force being imposed on the animal whereby it is dragged toward and onto the platform 11. Since the guide pulley 47 confines the portion of the cable which extends across the platform to an orientation which is approximately horizontal, this thus minimizes the force on the cable and hence the torque required to turn the crank 39. The cable force is thus effectively a pulling force of a magnitude sufficient to drag the animal across the floor, inasmuch as only a minimum lifting of the animal is thus required.

As the animal approaches the front end of the cart, the leading end of the animal engages the guide flange 29 which assists in slightly lifting the animal so that it can be pulled upwardly into the concave-shaped basket 11 through the open forward end thereof. The cable is continuously wound onto the drum until the animal is partially positioned on the basket 11, the desired position of the animal being such that the center of the animal (that is, its approximate center of gravity) is disposed substantially over the support axle 23. When so positioned, the weight of the animal is effectively concentrated directly over the support wheels 27, thereby resulting in the weight of the animal being effectively balanced on the cart whereby very little of the animal's weight is transmitted to the handle 33. When so positioned, however, the trailing end of the animal is still disposed in engagement with the floor and remains in engagement with the floor during transporting of the animal by the cart. By permitting a part of the animal to engage the floor, this provides additional stability in that it prevents the cart from tipping sidewardly due to the close spacing between the support wheels 27.

When the animal is being pulled onto the basket, as described above, the concave shape of the basket, and particularly the concave configuration of the support plate 16, causes the animal to be sidewardly displaced as necessary so that the weight of the animal is effectively centered over the center plate portion 17, whereby the weight of the animal is thus disposed between the closely-spaced support wheels 27. This concave configuration of the basket, and specifically the rounded configuration which is achieved by the angular inclination of the side plate portions 18, thus ensures effective centering of the animal between the sideward edges of the basket to prevent sideward tipping of the cart when the animal is positioned thereon.

After the animal has been positioned on the basket in the desired location, then the crank 39 is pivoted through an angle of 180° about the pivot pin 42. This results in the handle 43 projecting in the opposite direction so that its path of movement is intersected by the inclined handle portion 32. The handle 43 will thus contact the handle portion 32 so as to effectively lock the winch and prevent rotation of the drum in a direction which would permit removal of the animal from the cart.

With the animal locked on the cart, as described above, the cart can then be suitably moved to a desired location for disposal of the animal. The movement of the cart occurs in a leftward direction as viewed in FIG. 2 so that the rearward portion of the animal remains in engagement with the floor and is dragged therealong. This relationship accordingly minimizes the weight of the animal which is supported on the cart, since a substantial portion of the animal's weight is still supported by the floor. However, the engagement of the cart with the animal greatly minimizes the degree of engagement between the animal and the floor so that the force required to drag the animal along the floor, which force is exerted as a pulling force on the cart, is greatly minimized.

When reaching the desired disposal location, the animal can be easily removed from the cart by releasing the crank 39 and partially unwinding the cable to permit slack to occur therein. The cart is then pulled outwardly from beneath the animal, and the snare released from the animal, so that the cable can again be wound onto the drum.

Although a particular perferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A tiltable, handle-propelled, attendant-stabilized wheeled cart, comprising:

elongated platform means having an upwardly directed supporting surface, said platform means when in a position of use being disposed with the elongated longitudinal direction thereof extending substantially horizontally;

support roller means mounted on said platform means and adapted for rolling engagement with the ground or a floor, said support roller means being disposed below said supporting surface and rotatable about an axis which is substantially perpendicular to the longitudinal direction of said platform means, said support roller means being positioned with said axis disposed closely adjacent one end of said platform means;

guide means fixed to said platform means at said one end thereof to assist in guide a load, such as an animal, onto the supporting surface, said guide means including a platelike flange member rigidly fixed to said one end of the platform means and projecting outwardly and downwardly from said supporting surface at an angle of approximately 45°, said flange member having an upper edge thereof fixed to said platform means and substantially flush with said supporting surface;

elongated handle means fixed relative to said platform means and projecting outwardly and upwardly from the other end thereof; and winch means mounted on said handle means to permit a load to be pulled onto said platform means, said winch means including a rotatable drum having an elongated flexible cablelike member wound therearound, said cablelike member having engaging means associated with the free and thereof for engagement with the load.

2. A tiltable, handle-propelled, attendant-stabilized wheeled cart, comprising:

elongated platform means having an upwardly directed supporting surface, said platform means when in a position of use being disposed with the elongated longitudinal direction thereof extending substantially horizontally;

support roller means mounted on said platform means and adapted for rolling engagement with the ground or a floor, said support roller means being disposed below said supporting surface and rotatable about an axis which is substantially perpendicular to the longitudinal direction of said platform means, said support roller means being positioned with said axis disposed closely adjacent one end of said platform means;

guide means fixed to said platform means at said one end thereof to assist in guiding a load, such as an animal, onto the supporting surface, said guide means including a platelike flange member fixed to said one end of the platform means and projecting outwardly and downwardly from said supporting surface;

elongated handle means fixed relative to said platform means and projecting outwardly and upwardly from the other end thereof;

winch means mounted on said handle means to permit a load to be pulled onto said platform means, said winch means including a rotatable drum having an elongated flexible cablelike member would therearound, said cablelike member having engaging means associated with the free end thereof for engagement with the load; and guide pulley means mounted on said handle means at a location disposed below said drum, said guide pulley means being positioned slightly above the supporting surface and aligned substantially with the longitudinally extending centerline thereof so that the cablelike member passes substantially horizontally over and closely adjacent the supporting surface to permit pulling of a load onto said supporting surface.

3. A cart according to claim 2, wherein said handle means includes an elongated rodlike handle which extends outwardly and upwardly from said other end of the platform means at an angle of approximately 45°, said handle member being connected to said platform means substantially at the midpoint of said other end.

4. A cart according to claim 2, wherein said platform means, when viewed in a transverse plane, has an upwardly opening channel-like shape.

5. A tiltable, handle-propelled, attendant-stabilized wheeled cart, comprising:

elongated platform means having an upwardly directed supporting surface, said platform means when in a position of use being disposed with the elongated longitudinal direction thereof extending substantially horizontally, and said platform means being of an upwardly opening channel-shaped configuration when viewed in a plane which is transverse with respect to said longitudinal direction;

said platform means includes a substantially horizontally extending center portion bounded by a pair of side portions which extend longitudinally along the center portion throughout the length of the platform means, said side portions each extending outwardly and upwardly relative to the center portion;

support roller means mounted on said platform means and adapted for rolling engagement with the ground or a floor, said support roller means being disposed below said supporting surface and rotatable about an axis which is substantially perpendicular to the longitudinal direction of said platform means, said support roller means being positioned with said axis disposed closely adjacent one end of said platform means;

guide means fixed to said platform means at said one end thereof to assist in guiding a load, such as an animal, onto the supporting surface, said guide means including a platelike flange member fixed to said one end of the platform means and projecting outwardly and downwardly from said supporting surface;

elongated handle means fixed relative to said platform means and projecting outwardly and upwardly from the other end thereof, said handle means including an elongated handle member which is fixed to said other end of the platform means substantially at the midpoint thereof, said handle member extending outwardly and upwardly from said platform means so as to be inclined with respect to the substantially horizontal supporting surface defined by the center portion of the platform means, said handle member being disposed substantially within a vertical plane containing therein the longitudinally extending centerline of the platform means; and drum means rotatably supported on said handle member and having elongated cable means wound therearound, said cable means being adapted for attachment to a load to permit said load to be pulled onto said platform means.

6. A cart according to claim 5, wherein said drum means has rotatable crank means associated therewith to permit manual rotation of said drum means, and the free end of said cable means having snare means associated therewith for engagement with the load.

7. A cart according to claim 5, wherein said cart is supported solely by said roller means located adjacent said one end of the platform means.

8. A handle-propelled wheeled cart, comprising:

elongated platform means having an upwardly directed supporting surface, said platform means when in a position of use being disposed with the elongated longitudinal direction thereof extending substantially horizontally;

support roller means mounted on said platform means and adapted for rolling engagement with the ground or a floor, said support roller means being disposed below said supporting surface and rotatable about an axis which is substantially perpendicular to the longitudinal direction of said platform means, said support roller means being positioned with said axis disposed closely adjacent one end of said platform means;

elongated handle means fixed to said platform means at the other end thereof and projecting upwardly from the supporting surface;

winch means mounted on said handle means to permit a load to be pulled onto said platform means, said winch means including a rotatable drum having elongated flexible cable means wound therearound, said cable means having engaging means associated with the free end thereof for engagement with the load; and guide pulley means mounted on said handle means at a location disposed below and drum, said guide pulley means being positioned slightly above the supporting surface and aligned substantially with the longitudinally extending centerline thereof so that the cable means passes substantially horizontally over and closely adjacent the supporting surface to permit pulling of a load onto said supporting surface.

9. A cart according to claim 8, wherein said platform means has an upwardly opening channel-like shape when viewed in a transverse plane, and wherein said platform means includes a substantially horizontally extending center portion bounded by a pair of side portions which extend longitudinally along the center portion throughout the length of the platform means, said side portions being outwardly and upwardly inclined relative to the center portion.

10. A cart according to claim 8, including a platelike guide flange fixed to said platform means at said one end thereof, said guide flange extending across a substantial portion of said platform means and being outwardly and downwardly inclined relative to said supporting surface to facilitate the movement of a load onto said supporting surface.

11. A handle-propelled wheeled cart, comprising:
elongated platform means having an upwardly directed supporting surface, said platform means when in a position of use being disposed with the elongated longitudinal direction thereof extending substantially horizontally;
said platform means having an upwardly opening channel-like shape when viewed in a transverse plane, and said platform means including a substantially horizontally extending center portion bounded by a pair of side portions which extend longitudinally along the center portion throughout the length of the platform means, said side portions being outwardly and upwardly inclined relative to the center portion;
support roller means mounted on said platform means and adapted for rolling engagement with the ground or a floor, said support roller means being disposed below said supporting surface and rotatable about an axis which is substantially perpendicular to the longitudinal direction of said platform means, said support roller means being positioned with said axis disposed closely adjacent one end of said platform means;
a planar guide flange fixed to said platform means at said one end thereof, said flange extending across the center portion of said platform means and being outwardly and downwardly inclined relative to said supporting surface;
elongated handle means fixed to said platform means at the other end thereof and projecting upwardly from the supporting surface; and
winch means mounted on said handle means to permit a load to be pulled onto said platform means, said winch means including a rotatable drum having elongated flexible cable means wound therearound, said cable means having engaging means associated with the free end thereof for engagement with the load.

12. A cart according to claim 11, wherein said handle means includes an elongated rodlike handle which extends outwardly and upwardly from said other end of the platform means at an angle of approximately 45°, said handle member being connected to said platform means substantially at the midpoint of said other end.

* * * * *

UNITED STATES PATENT AND TRADEMARK OFFICE
CERTIFICATE OF CORRECTION

PATENT NO. : 4 052 080
DATED : October 4, 1977
INVENTOR(S) : Fred L. Hedderich and Curtis C. George It is certified that error appears in the above-identified patent and that said Letters Patent are hereby corrected as shown below:

Column 6, line 50; change "guide" to ---guiding---.

Column 6, line 67; change "and" to ---end---.

Column 7, line 31; change "would" to ---wound---.

Column 9, line 2; change "and" to ---said---.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*